US006840454B1

(12) United States Patent
Rhelimi

(10) Patent No.: US 6,840,454 B1
(45) Date of Patent: Jan. 11, 2005

(54) DATA TRANSMISSION METHOD AND CARD THEREFOR

(75) Inventor: Alain Rhelimi, Cachan (FR)

(73) Assignee: Schlumberger Systemes, Montrouge (FR)

( * ) Notice: Subject to any disclaimer, the term of this patent is extended or adjusted under 35 U.S.C. 154(b) by 0 days.

(21) Appl. No.: 09/786,962

(22) PCT Filed: Sep. 2, 1999

(86) PCT No.: PCT/FR99/02095

§ 371 (c)(1),
(2), (4) Date: Jul. 12, 2001

(87) PCT Pub. No.: WO00/16255

PCT Pub. Date: Mar. 23, 2000

(30) Foreign Application Priority Data

Sep. 11, 1998 (FR) .............................. 98 11374

(51) Int. Cl.[7] .............................................. G06K 19/06
(52) U.S. Cl. ...................................... 235/492; 718/302
(58) Field of Search ................................. 235/441, 492; 710/301, 302; 713/500, 501; 902/26

(56) References Cited

U.S. PATENT DOCUMENTS

| 5,420,412 | A | | 5/1995 | Jacek ........................... 235/492 |
| 5,875,321 | A | * | 2/1999 | Sengoku ...................... 713/501 |
| 6,151,647 | A | * | 11/2000 | Sarat ............................ 710/301 |
| 6,199,128 | B1 | * | 3/2001 | Sarat ............................ 710/301 |
| 6,343,364 | B1 | * | 1/2002 | Leydier et al. .............. 713/500 |
| 6,439,464 | B1 | * | 8/2002 | Fruhauf et al. .............. 235/492 |
| 6,543,690 | B2 | * | 4/2003 | Leydier et al. .............. 235/492 |
| 6,581,122 | B1 | * | 6/2003 | Sarat ........................... 710/301 |
| 6,634,565 | B2 | * | 10/2003 | Gray ........................... 235/492 |
| 6,658,516 | B2 | * | 12/2003 | Yao .............................. 710/301 |
| 6,694,399 | B1 | * | 2/2004 | Leydier et al. ............. 710/301 |
| 2002/0066791 | A1 | * | 6/2002 | Leydier et al. ............. 235/492 |
| 2003/0085287 | A1 | * | 5/2003 | Gray ........................... 235/492 |
| 2003/0155424 | A1 | * | 8/2003 | Guion et al. ................ 235/492 |
| 2003/0168515 | A1 | * | 9/2003 | Gray ........................... 235/492 |
| 2004/0030818 | A1 | * | 2/2004 | Chen et al. .................. 710/74 |

FOREIGN PATENT DOCUMENTS

| JP | 62-224874 A | * 10/1987 |
| WO | WO 98/29830 | 7/1998 |
| WO | WO 99/46415 | 9/1999 |

OTHER PUBLICATIONS

"Halbleiter–Schaltungstechnik", U. Tietze et al., Springer–Verlag 1991 ISBN 3–540–19475–4, p. 223 no month.

* cited by examiner

Primary Examiner—Jared J. Fureman
(74) Attorney, Agent, or Firm—Pehr Jansson; Leonard Pojunas

(57) ABSTRACT

A portable article of the smart card type and a method of transmitting data to such an article. The article comprises an article body and an integrated circuit chip. The integrated circuit chip comprises a central processor unit (CPU) connected via a data and address bus to memories (ROM, RAM, EEPROM), and at least four contact pads (VCC, GND, RST, VPP, CLK, I/O, D+, D−) connected to four contact areas (C1, C5, C4, C8) of a set of at least six contact areas flush with the surface of the card body. Two of the contacts pads (D+, D−) are connected to an interface of the card and are suitable for providing data transmission handled by the central processor unit (CPU) such as for transmitting data using the universal serial bus (USB) protocols and formats.

10 Claims, 4 Drawing Sheets

DATA TRANSMISSION METHOD AND CARD THEREFOR

This application is a U.S. National Phase Application under 35 USC 371 of International Application PCT/FR99/02095 (not published in English) filed Sep. 2, 1999.

FIELD OF THE INVENTION

The invention relates to portable articles of the smart card type comprising firstly an article body and secondly an integrated circuit chip.

BACKGROUND OF THE INVENTION

Smart cards are standardized articles described in particular in ISO standard 7816 and their main function is to enable electronic transactions to be performed by identifying the bearer. To this end, smart cards include a chip whose circuits integrated on a silicon substrate define various functional elements, and in particular a central processor unit (CPU) and volatile memory (RAM), non-volatile memory (ROM) and electrically erasable and programmable non-volatile memory (EEPROM). The central processor unit (CPU) manages data and addresses in the various memories by means of a bus. In general, data and addresses are respectively encoded on 8 bits and on 16 bits.

The integrated circuit chips are provided with six contact pads: these pads being identified by the initials VCC, GND, VPP, RST, CLK, and I/O, and serving respectively to supply the chip with electricity, to ground it, to supply it with a programming voltage, to reset it, to input a clock signal, and to perform data input and output. These pads are electrically connected to contact areas that are flush with the surface of the card. The VCC pad is connected to an area C1, the GND pad to an area C5, the VPP pad to an area C6, the RST pad to an area C2, the CLK pad to an area C3, and the I/O pad to an area C7.

Part 2 of above-specified ISO standard 7816 relates to the number, size, and positioning of the electric contact areas on the card. Thus, as defined in that standard, in addition to the areas C1, C5, C6, C2, C3, and C7, the card also has two areas C4 and C8 that are reserved for future use. No function has been allocated to these areas which are not connected.

Part 3 of the 7816 standard relates to the various transmission protocols and signals that the card must comply with. In the protocols known as T=0 and T=1, data is transmitted solely via the I/O pad in half-duplex mode and asynchronously, using defined formats. The data rates authorized in those data formats and protocols are slow, of the order of 38 kilobits per second (kb/s) and multipoint links are not allowed.

As a result, when a state of the art card is to be used with a non-specialist terminal which does not make use of the above-specified protocols and formats of Part 3 of the 7816 standard, i.e. in fact most terminals available on the market, and in particular personal computers, it is necessary to use a card reader which serves not only to turn the card on and off, but also to perform protocol conversion and to reformat data so as to make it usable by the card. Since the data rates allowed for the card are slow, it cannot be used for applications that require fast transfer of data such as encoding/decoding information in real time.

OBJECTS AND SUMMARY OF THE INVENTION

The invention relates to a portable article of the smart card type, the article comprising firstly a body and secondly an integrated circuit chip, said integrated circuit chip having a central processor unit connected via a data and address bus to memories, and further including at least a first contact pad suitable for providing the chip with a power supply voltage, a second contact pad suitable for grounding the chip, a third contact pad and a fourth contact pad, said contact pads being electrically connected respectively to a first contact area, a second contact area, a third contact area, and a fourth contact area of a set of at least six contact areas flush with the surface of the article body, and one object of the invention is to enable such a portable article to operate in manners other than those specified by Part 3 of the 7816 standard, and in particular without using the T=0 and T=1 protocols and the formats required of data as described in that standard.

This and other objects are attained in accordance with one aspect of the invention which provides a portable article, characterized in that the third and fourth contacts pads connected to an interface of the chip constitute a differential pair and are suitable for providing both-way data transmission under the control of the central processor unit.

Another aspect of the invention also provides a method of transmitting data to an integrated circuit chip, which method is characterized in that the data handled by the central processor unit is transmitted in both directions via the third and fourth contact pads which constitute a differential pair and are connected to an interface of the chip.

BRIEF DESCRIPTION OF THE DRAWINGS

The following description, which is not limiting in any way, serves to make it easier to understand how the invention can be implemented in practice. It should be read with reference to the accompanying drawings, in which.

DETAILED DESCRIPTION OF THE DRAWINGS

The portable articles of the invention are of the smart card type.

Figure 1:
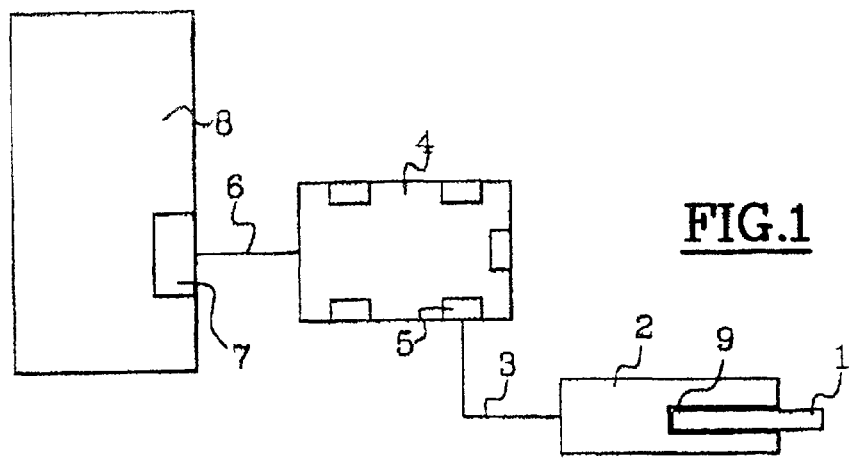
FIG. 1 is a diagram of a card of the invention inserted in a slot of a reader connected to a personal computer port via a hub.

As can be seen in FIG. 1, portable articles of the smart card type 1 are for insertion in a slot of a reader 2, which reader 2 is connected via a connecting cable 3 to a hub 4, for example, said hub having at least one port 5 in particular a USB type port, and being connected via a link cable 6 to a port 7, in particular a USB type port of a central unit 8.

Smart cards are standardized articles as defined in particular in ISO standards 7810, 7816, and 14443, and the content thereof is incorporated in the present description by reference.

They are in the form of flat rectangular parallelepipeds having dimensions of about 85 millimeters (mm) in length, 54 mm in width, and 760 micrometers ($\mu$m) in thickness, and they comprise a card body within which a chip 9 is integrated.

The card body comprises one or more thermoplastic or thermosetting layers.

The chip 9 is a silicon die carrying integrated circuits of topology that defines various functional elements of the chip that are interconnected by the lines of a data and address bus 10. As shown diagrammatically in FIGS. 3 and 4, these elements comprise in particular a central processor unit CPU, a volatile memory RAM, a non-volatile program memory ROM, an electrically erasable and programmable non-volatile memory EEPROM, and in accordance with the invention a special interface, in particular a USB interface. This is a differential-signal interface that is able to receive and transmit data in the form of differential signals. Further details about such signals and the interface are provided below.

The chip 9 has at least four contact pads: a first contact pad VCC, a second contact pad GND, a third contact pad D+, and a fourth contact pad D−, said third and fourth contact pads D+ and D− being connected to the USB interface. In addition, the chip 9 also optionally carries a fifth contact pad VPP, a sixth contact pad RST, a seventh contact pad CLK, and an eighth contact pad I/O.

Figure 2:
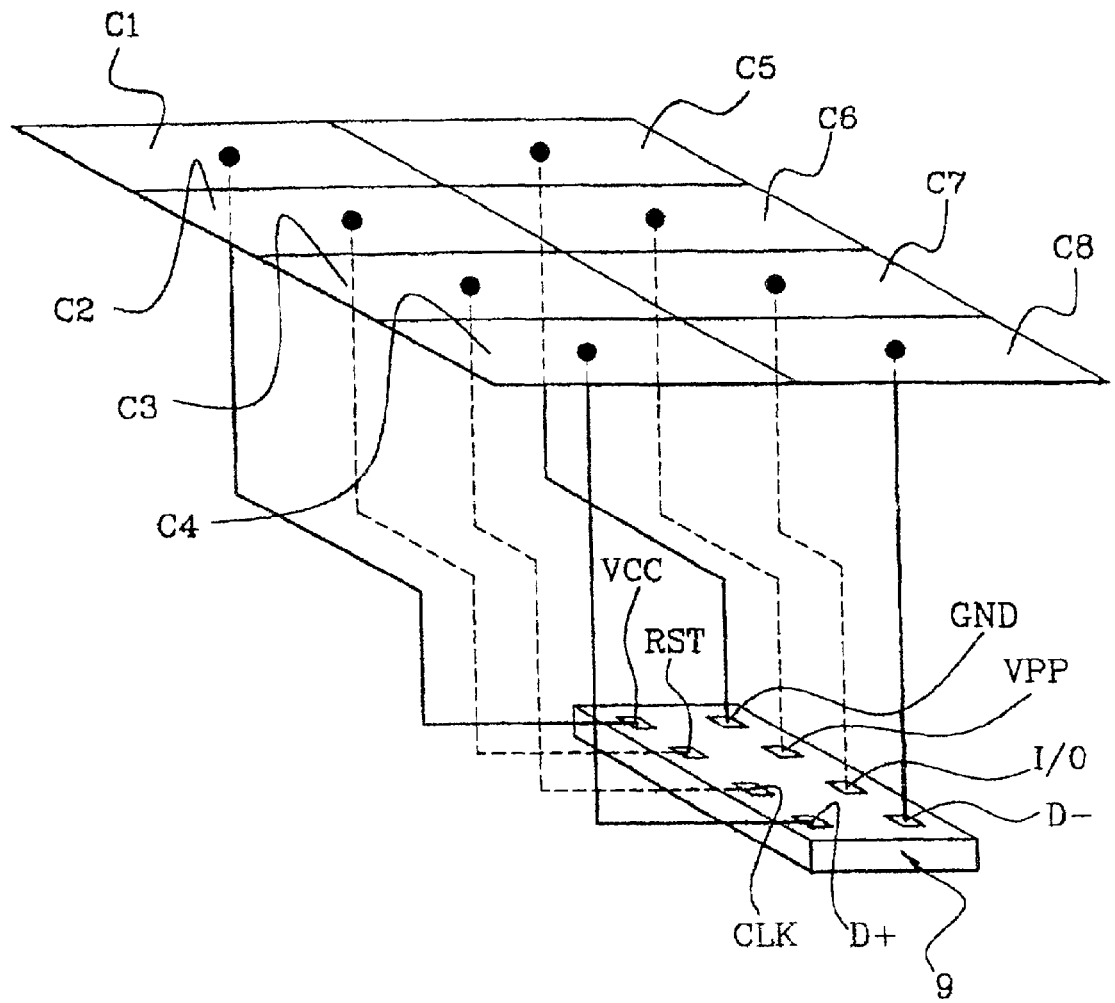
FIG. 2 is a perspective view of a chip electrically connected to the contact areas of a smart card of the invention.

As shown in FIG. 2, the contact pads VCC, GND, D+, and D− are electrically connected respectively to a first contact area C1, a second contact area C5, a third contact area C4, and a fourth contact area C8 of a set of eight contact areas C1, C2, C3, C4, C5, C6, C7, and C8 that are flush with the surface of the card body. The contact pads VPP, RST, CLK, and I/O are optionally electrically connected respectively to a fifth contact area C6, a sixth contact area C2, a seventh contact area C3, and an eighth contact area C7 of the above-mentioned set.

Cards of the invention are suitable for communicating with the outside world, i.e. with a terminal such as a personal computer for example, by means solely of the contact pad VCC which provides the chip with a power supply voltage, the pad GND which grounds the chip, and the pads D+ and D− which provide both-way data transmission.

When data transmission is provided by the contact pads D+ and D−, the format of the data and the protocols used are those defined in the Jan. 15, 1996 revision of Version 1.0 of the USB standard, and the content thereof or of subsequent USB standards is incorporated in the present description by reference.

In that standard, the pads D+ and D− constitute a differential pair, the potentials present on said pads being opposite to each other. When the potential of D+ is greater than the potential of D−, then a logic "1" is transmitted, and when the potential of D− is greater than the potential of D+, then a logic "0" is transmitted.

The USB interface of the card decodes the data transmitted by the pads D+ and D− and reformats it so that said data can be handled by the CPU.

Data transmission via the pads D+ and D− using the protocols defined in the USB standard provides numerous advantages.

Firstly, the rate at which data is transmitted can reach 12 megabits per second (Mb/s) which is well above the 38 kb/s rate for data transmitted via the I/O pad using the protocols and formats defined in ISO standard 7816.

Furthermore, data transmission takes place synchronously in half-duplex mode, i.e. in alternation, and although it is possible to transmit a clock signal via the pad CLK that is no longer necessary. In the invention, the clock is advantageously generated internally within the card, e.g. by means of a digital phase-locked loop (DPLL). Depending on the transmitted data rate, 1.5 Mb/s at low speed and 12 Mb/s at high speed, the card itself determines its operating speed by means of pull-up resistors connected to the pads D+ or D−, and the DPLL locks so that the clock generated in this way is compatible with the rate at which data is transmitted and so as to make it possible to decode the transmitted data frames. It is advantageous to use a frequency multiplier internal to the card.

Thus, the fraud that relies on analyzing electrical signatures becomes more difficult since such fraud requires external control of the clock via the CLK pad, and that is not permitted when data is transmitted via the D+ and D− pads.

It will be understood that these advantages enable a card of the invention to perform encrypting and decrypting operations in real time and at a high data rate, e.g. in pay TV applications or in other applications, in particular applications relating to encrypting information in a network.

It will be observed that in one embodiment of the invention, the cards can also operate using asynchronous protocols such a T=0 and T=1 as defined in Part 3 of ISO standard 7816, in which case the I/O pad is used for inputting and outputting data signals, the RST pad for resetting the chip, the CLK pad for providing the chip with a clock signal, and optionally the VPP pad for providing the chip with a programming voltage. Such cards could then be used with a state of the art reader, with the reader in turn performing USB/ISO data reformatting and protocol conversion.

It should also be observed that data transmission using USB and ISO protocols can take place simultaneously with the CPU handling both data transmitted via the I/O pad and data transmitted by the D+ and D− pads.

Figure 3:
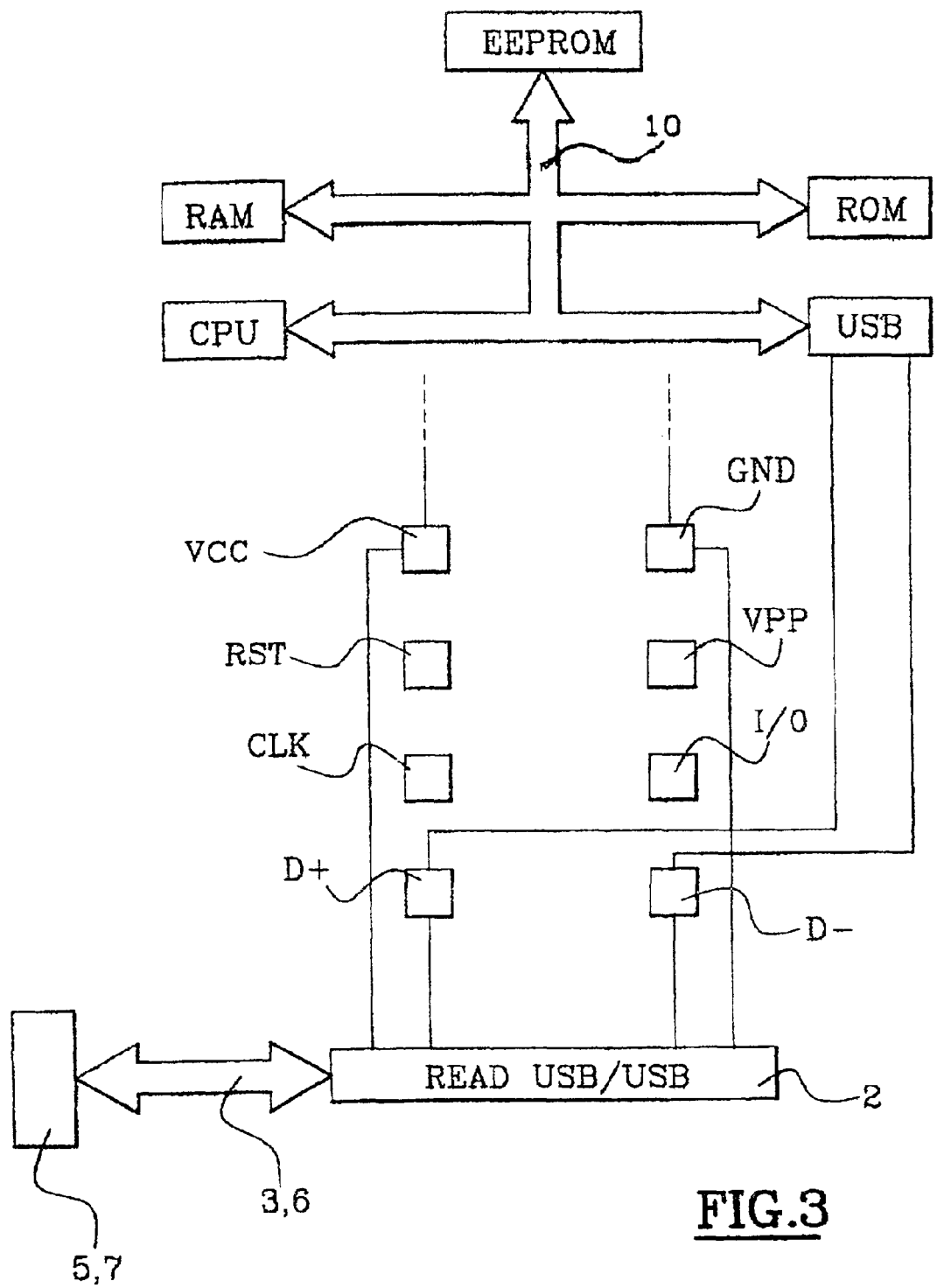
FIG. 3 shows the various elements of an integrated circuit chip of a card of the invention connected to a card reader for transmitting data using the universal serial bus (USB) protocols.
Figure 4:
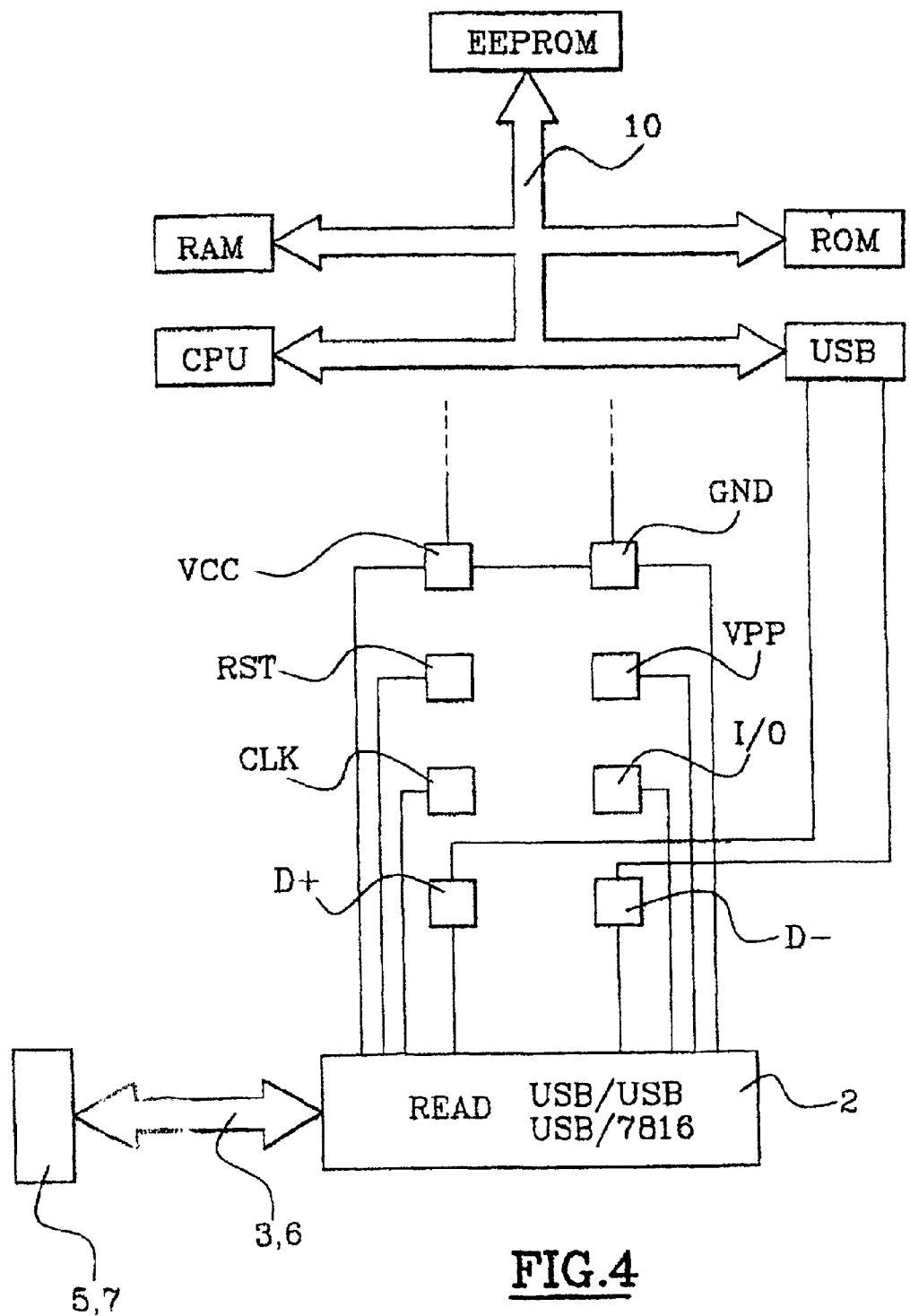
FIG. 4 shows the various elements of an integrated circuit chip of a smart card of the invention connected to a card reader for transmitting data using USB protocols and protocols from Part 3 of ISO standard 7816.

In order to make use of the USB facilities of cards of the invention, readers of the kind shown diagrammatically in FIGS. 3 and 4 include means for making connections at least to the areas C1, C5, C4, and C8 of the card, which areas are electrically connected to the pads VCC, GND, D+, and D− of the chip 9.

If, as in FIG. 3, said readers 2 have means only for making connection to the areas C1, C5, C4, and C8 of the card, then such readers 2 are no more than mere electrical connectors for transmitting data, power, and ground, thus considerably reducing the cost of such a reader.

In contrast, if said readers 2 are also to read cards in compliance with ISO standard 7816, then they must also have means for making connections to the areas C6, C3, C2, and C7 of the card which are electrically connected to the pads RST, VPP, I/O, and CLK of the chip and they must be provided with an appropriate interface for converting data format and using protocols applicable to Part 3 of ISO standard 7816. USB or ISO 7816-3 operating mode is then selected either mechanically or electrically. Such readers can then be used to read a variety of dissimilar cards: cards that operate in compliance with the ISO standard only, cards that operate via the USB interface only, and cards that can operate in both ways.

Figure 5:
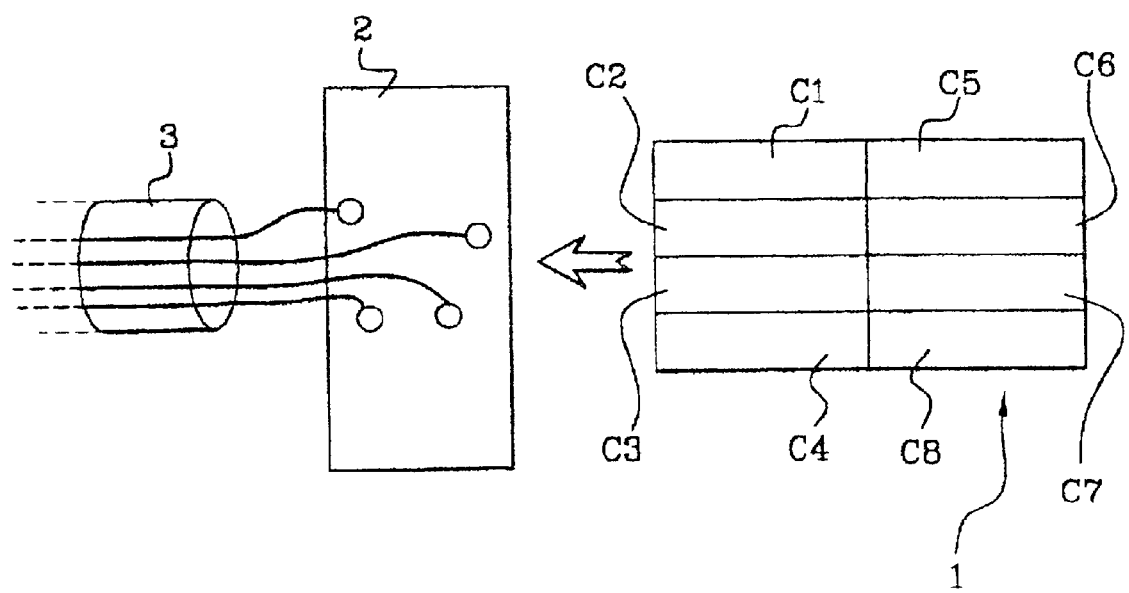
FIG. 5 is a diagram that illustrates connecting a card to a connector of a reader.

In a particularly advantageous embodiment shown diagrammatically in FIG. 5, the connector of a reader for reading a card of the invention is made in such a manner that the connection sequence takes place mechanically as follows during card insertion: initially a connection is made to area C5, and then to areas C4 and C8, and finally connection is made to the area C1 to power the chip. This is advantageous because the IC receives a power supply voltage from the reader via C5 and C1 only after the areas C4 and C8 have received a defined voltage from the reader. This ensures that the signal inputs coupled to areas C4 and C8 already have defined voltages once the chip becomes active. This prevents malfunctioning of the chip which might otherwise occur if the chip were to receive a power supply voltage while the signal inputs coupled to areas C4 and C8 have undefined voltages because they are not connected.

In other embodiments of the invention, six contact areas only of the card are used, for example contact areas C1, C1, C3, C5, C6 and C7 only. In such embodiments, the contact areas C1 and C5 are preferably connected to the pads VCC and GND of the chip. Any of the remaining contact areas may be connected to the pad D+ of the chip and any of the further remaining contact areas may be connected to the pad D−. It should be observed that, in all embodiments, making a connection between the pad VPP and the area C7 remains optional.

What is claimed is:

1. A portable article of the smart card type, the article comprising firstly a body and secondly an integrated circuit chip (9), said integrated circuit chip (9) having a central processor unit (CPU) connected via a data and address bus to memories (ROM, RAM, EEPROM), and further including at least a first contact pad (VCC) suitable for providing the chip (9) with a power supply voltage, a second contact pad (GND) suitable for grounding the chip (9), a third contact pad (D+) and a fourth contact pad (D−), said contact pads (VCC, GND, D+, D−) being electrically connected respectively to a first contact area (C1), a second contact area (C5), a third contact area (C4), and a fourth contact area (C8) of a set of eight contact areas (C1, C2, C3, C4, C5, C6, C7, C8) flush with a surface of the article body, the third and fourth contacts pads (D+, D−) being connected to an interface of the chip (9) and being suitable for providing data transmission under the control of the central processor unit (CPU), the chip (9) further including a fifth contact pad (VPP), a sixth contact pad (RST) suitable for resetting the chip (9), a seventh contact pad (CLK) suitable for providing the chip with a clock signal, and an eighth contact pad (I/O) suitable for inputting and outputting data signals using an asynchronous protocol, said sixth, seventh, and eighth contact pads (RST, CLK, I/O) being connected electrically respectively to a sixth contact area (C2), a seventh contact area (C3), and an eighth contact area (C7) of the set of eight contact areas flush with the surface of the article body.

2. A portable article according to claim 1, wherein the third and fourth pads (D+, D−) constitute a differential pair, a potentials present on the third pads being opposite a potential on the fourth pad.

3. A portable article according to claim 1, wherein the third and fourth pads (D+, D−) are suitable for transmitting data using protocols defined in the universal serial bus (USB) standard.

4. A method of transmitting data to an integrated circuit chip (9) of a portable article of the smart card type including an article body, said integrated circuit chip (9) comprising a central processor unit (CPU) connected via a data and address bus to memories (ROM, RAM, EEPROM) and further comprising at least a first contact pad (VCC) suitable for providing the chip with a power supply voltage, a second contact pad (GND) suitable for grounding the chip (9), a third contact pad (D+) and a fourth contact pad (D−), said contact pads (VCC, GND, D+, D−) being electrically connected respectively to a first contact area (C1), a second contact area (C5), a third contact area (C4), and a fourth contact area (C8) of a set of eight contact areas (C1, C2, C3, C4, C5, C6, C7, C8) flush with a surface of the article body, in which method a data handled by the central processor unit (CPU) is transmitted via the third and fourth contact pads (D+, D−) connected to an interface of the chip (9), and wherein a sixth contact pad (RST) resets the chip (9), a seventh contact pad (CLK) provides the chip (9) with a clock signal, and an eighth contact pad (I/O) provides data signal input and output using an asynchronous protocol, said sixth, seventh, and eighth contact pads (RST, CLK, I/O) being electrically connected respectively to a sixth contact area (C2), a seventh contact area (C3), and an eighth contact area (C7) of the set of eight contact areas flush with the surface of the article body.

5. A method according to claim 4, wherein the third and fourth contact pads (D+, D−) constitute a differential pair.

6. A method according to claim 4, wherein data transmission via the third and fourth pads (D+, D−) takes place in both directions in alternation.

7. A method according to claim 4, wherein to process data transmitted via the third and fourth contact pads (D+, D−), a clock is generated internally in the chip.

8. A method according to claim 4, wherein data is transmitted via the third and fourth contact pads (D+, D−) using a synchronous communications protocol.

9. A method according to claim 4, wherein data transmission is provided at rates going up to a value of about 12 megabits per second.

10. A method according to claim 4, wherein data transmission is provided using protocols in compliance with the universal serial bus (USB) standard.

* * * * *